US011218290B2

(12) United States Patent
Tueno et al.

(10) Patent No.: US 11,218,290 B2
(45) Date of Patent: Jan. 4, 2022

(54) EFFICIENT CLOUD-BASED SECURE COMPUTATION OF THE MEDIAN USING HOMOMORPHIC ENCRYPTION

(71) Applicant: SAP SE, Walldorf (DE)

(72) Inventors: Anselme Kemgne Tueno, Erlenbach (CH); Florian Kerschbaum, Waterloo (CA)

(73) Assignee: SAP SE, Walldorf (DE)

(*) Notice: Subject to any disclaimer, the term of this patent is extended or adjusted under 35 U.S.C. 154(b) by 350 days.

(21) Appl. No.: 16/289,399

(22) Filed: Feb. 28, 2019

(65) Prior Publication Data
US 2020/0280430 A1 Sep. 3, 2020

(51) Int. Cl.
H04L 29/06 (2006.01)
H04L 9/00 (2006.01)
H04L 9/30 (2006.01)

(52) U.S. Cl.
CPC .............. H04L 9/008 (2013.01); H04L 9/30 (2013.01); H04L 2209/46 (2013.01)

(58) Field of Classification Search
CPC ........ H04L 2209/46; H04L 9/008; H04L 9/30
See application file for complete search history.

(56) References Cited

U.S. PATENT DOCUMENTS

| 8,526,603 B2* | 9/2013 | Kerschbaum | H04L 9/3218 380/30 |
| 10,630,486 B2* | 4/2020 | Lindell | H04L 9/3255 |
| 10,764,048 B2* | 9/2020 | Joye | G06K 9/6282 |
| 10,862,684 B2* | 12/2020 | Hong | H04W 4/70 |
| 2007/0116283 A1* | 5/2007 | Tuyls | H04L 9/0844 380/255 |
| 2008/0133935 A1* | 6/2008 | Elovici | H04L 63/08 713/193 |
| 2012/0121080 A1* | 5/2012 | Kerschbaum | H04L 9/0643 380/28 |

(Continued)

FOREIGN PATENT DOCUMENTS

| EP | 3016011 A1 * | 5/2016 | ......... G06F 21/6245 |
| EP | 3340067 A1 * | 6/2018 | ............ G06F 17/18 |

OTHER PUBLICATIONS

Becher et al., "An Enhanced Approach to Cloud-based Privacy-preserving Benchmarking (Long Version)," arXiv.org, Cornell University Library, Ithaca, NY, pp. 1-12 (2018).

(Continued)

Primary Examiner — Chau Le
(74) Attorney, Agent, or Firm — Erise IP, P.A.

(57) ABSTRACT

A server receives a corresponding data value encrypted using a common threshold public key from each of a plurality of clients. The server distributes the received data values to the clients for evaluating comparison of values. The server receives the encrypted comparison results from each of the clients in response to the distribution of the received encrypted data values. The comparison results are encrypted using the common key. The server homomorphically determines a ciphertext encrypting the rank of each client's data value using the comparison results. Further, the server can compute a ciphertext encrypting the median of the datasets. Thereafter, the server can initiate a threshold decryption to generate a final result.

20 Claims, 7 Drawing Sheets

(56) References Cited

U.S. PATENT DOCUMENTS

| | | | | |
|---|---|---|---|---|
| 2015/0295712 | A1* | 10/2015 | Veugen | H04L 63/0428 713/153 |
| 2018/0373882 | A1* | 12/2018 | Veugen | G06F 21/602 |
| 2019/0036678 | A1* | 1/2019 | Ahmed | H04L 9/302 |
| 2019/0228299 | A1* | 7/2019 | Chandran | G06N 3/0481 |
| 2020/0279045 | A1* | 9/2020 | Tueno | H04L 9/30 |
| 2020/0280430 | A1* | 9/2020 | Tueno | H04L 9/008 |
| 2020/0295934 | A1* | 9/2020 | Diaz Vico | H04L 9/0894 |
| 2021/0344489 | A1* | 11/2021 | Becher | H04L 67/42 |

OTHER PUBLICATIONS

Blass et al., "Strain: A Secure Auction for Blockchains," International Conference on Financial Cryptography and Data Security, Lecture Notes in Computer Science, Lopez et al. eds., Springer, Berlin, 87-110 (2018).

Bogdanov et al., "Rmind: a tool for cryptographically secure statistical analysis," International Association for Cryptologic Research, 20140630:165415, pp. 1-35 (2014).

G. Aggarwal, N. Mishra, and B. Pinkas. Secure Computation of the Median (and Other Elements of Specified Ranks). J. Cryptol. 23(3):373-401 (2010).

G. Aggarwal, N. Mishra, and B. Pinkas. Secure computation of the $k^{th}$-ranked element. In Advances in Cryptology—Eurocrypt 2004, International Conference on the Theory and Applications of Cryptographic Techniques, Interlaken, Switzerland, May 2-6, 2004, Proceedings, pp. 40-55, 2004.

M. Bellare, V. T. Hoang, and P. Rogaway. Foundations of garbled circuits. In Proceedings of the 2012 ACM Conference on Computer and Communications Security, CCS '12, pp. 784-796, New York, NY, USA, 2012. ACM.

M. Ben-Or, S. Goldwasser, and A. Wigderson. Completeness theorems for non-cryptographic fault-tolerant distributed computation. STOC '88, pp. 1-10, New York, NY, USA, 1988. ACM.

Boneh et al., "Threshold Cryptosystems From Threshold Fully Homomorphic Encryption," IACR Cryptology ePrint Archive, 2017pp. 1-61.

D. Chaum, C. Crépeau, and I. Damgard. Multiparty unconditionally secure protocols. STOC '88, pp. 11-19, New York, NY, USA, 1988. ACM.

J. H. Cheon, M. Kim, and K. E. Lauter. Homomorphic computation of edit distance. In Financial Cryptography and Data Security—FC 2015 International Workshops, Bitcoin, WAHC, and Wearable, San Juan, Puerto Rico, Jan. 30, 2015, Revised Selected Papers, pp. 194-212, 2015.

J. H. Cheon, M. Kim, and M. Kim. Search-and-compute on encrypted data. In Financial Cryptography and Data Security—FC 2015 International Workshops, Bitcoin, WAHC, and Wearable, San Juan, Puerto Rico, Jan. 30, 2015, Revised Selected Papers, pp. 142-159, 2015.

R. Cramer, I. Damgard, and J. Buus Nielsen. Multiparty Computation from Threshold Homomorphic Encryption. In Proc. of Eurocrypt, pp. 280-299. Springer-Verlag, 2001.

I. Damgård and M. Jurik. "A Generalisation, a Simplification and some Applications of Paillier's Probabilistic Public-Key System," BRIGS, RS-00-45; pp. 1-18, Dec. 2000.

T. ElGamal, "A Public Key Cryptosystem and a Signature Scheme Based on Discrete Logarithms," IEEE Trans. Inform. Theory 31:469-472 (1985).

C. Genty. Fully homomorphic encryption using ideal lattices. STOC '09, pp. 169-178, New York, NY, USA, 2009. ACM.

O. Goldreich, S. Micali, and A. Wigderson. How to play any mental game. STOC '87, pp. 218-229, New York, NY, USA, 1987. ACM.

F. Kerschbaum. Adapting privacy-preserving computation to the service provider model. In Proceedings of the 12th IEEE International Conference on Computational Science and Engineering, CSE 2009, Vancouver, BC, Canada, Aug. 29-31, 2009, pp. 34-41, 2009.

F. Kerschbaum. Practical privacy-preserving benchmarking. In Proceedings of The IFIP TC-11 23rd International Information Security Conference, IFIP 20th World Computer Congress, IFIP SEC 2008, Sep. 7-10, 2008, Milano, Italy, pp. 17-31, 2008.

Koblitz et al., "The State of Elliptic Curve Cryptography," Designs, Codes and Cryptography 19:173-193 (2000).

Koblitz, "Elliptic Curve Cryptosystems," Mathematics of Computation 48(177):203-209 (1987).

Myers, S., Sergi, M., Shelat, A.: "Threshold Fully Homomorphic Encryption and Secure Computation," IACR Cryptology ePrint Archive, 2011:454 (pp. 1-37).

Naor, M., Pinkas, B., and Sumner, R., "Privacy preserving auctions and mechanism design," in Proceedings of the 1st ACM conference on Electronic commerce. ACM, 1999, pp. 129-139.

P. Paillier. Public-Key Cryptosystems Based on Composite Degree Residuosity Classes. In Proceedings of the $17^{th}$ International Conference on Theory and Application of Cryptographic Techniques, Eurocrypt'99, pp. 223-238, Berlin, Heidelberg, 1999. Springer-Verlag.

R. Rivest, A. Shamir, and L. Adleman, "A Method for Obtaining Digital Signatures and Public Key Cryptosystems," Commun. ACM, vol. 21, No. 2, pp. 120-126, Feb. 1978.

T. Veugen. Improving the DGK comparison protocol. In WIFS, pp. 49-54, 2012.

A. C. Yao. Protocols for secure computations. In Proceedings of the $23^{rd}$ Annual Symposium on Foundations of Computer Science, SFCS '82, pp. 160-164, Washington, DC, USA, 1982. IEEE Computer Society.

A. C. Yao. How to generate and exchange secrets (extended abstract). In 27th Annual Symposium on Foundations of Computer Science, Toronto, Canada, Oct. 27-29, 1986, pp. 162-167. IEEE Computer Society, 1986.

* cited by examiner

EFFICIENT CLOUD-BASED SECURE COMPUTATION OF THE MEDIAN USING HOMOMORPHIC ENCRYPTION

TECHNICAL FIELD

The subject matter described herein relates to securely computing the median of the union of private datasets using homomorphic encryption.

BACKGROUND

Benchmarking is a management process where a company compares its Key Performance Indicators (KPI) to the statistics of the same KPIs of a group of competitors, named peer group. A KPI is a statistical quantity which measures the performance of a business process. Examples of KPI from different company operations are make cycle time (manufacturing), cash flow (financial) and employee fluctuation rate (human resources). A peer group is a group of (usually competing) companies that are interested in comparing their KPIs based on some similarity of the companies. Examples formed along different characteristics include car manufacturers (industry sector), Fortune 500 companies in the United States (revenue and location), or airline vs. railway vs. haulage (sales market). A big challenge for benchmarking is that the KPIs are very sensitive and highly confidential, even within one company.

Privacy is one of the biggest concerns in benchmarking. Companies are hesitant to share their business performance data due to the risk of losing a competitive advantage or being embarrassed. There exist privacy-preserving protocols, that can be used for benchmarking that keep the KPIs confidential within one company. However, they all require a communication link between any pair of parties, resulting in high communication overhead when the number of parties becomes very large.

SUMMARY

In a first aspect, a server receives a corresponding data value encrypted using a common threshold public key from each of a plurality of clients. The server distributes the received data values to the clients for evaluating comparison of values. The server receives the encrypted comparison results from each of the clients in response to the distribution of the received encrypted data values. The comparison results are encrypted using the common key. The server homomorphically determines a ciphertext encrypting the rank of each client's data value using the comparison results. Further, the server can compute a ciphertext encrypting the median of the datasets. Thereafter, the server can initiate a threshold decryption to generate a final result.

The received data values can be compared by each pair of clients using a Damgard, Geisler and Kroigaard (DGK) comparison protocol.

The threshold decryption can include transmitting, by the server, an encrypted evaluation result to each of t clients, receiving, by the server, a partial decryption of the transmitted encrypted evaluation result from each of the t clients, and combining the t values to result in the final result. The final result can be transmitted to each of the clients.

If a size of the datasets is odd, the median value is a middle value in the sorted datasets. If a size of the datasets is even, the median value is a mean of two middle values in the sorted datasets.

A first client can encrypt a data value of interest using a public key of the first client. The first client can transmit the encrypted data value of the first client to the server. The server can forward the encrypted data value of the first client to a second client. The second client can choose a random bit $\delta_{ji}$ and compute $s=1-2\delta_{ji}$ such that the random bit $\delta_{ji}$ is used to secret share a result of a comparison. The second client can homomorphically evaluate a comparison circuit on its own data value of interest and the encrypted data value of the first client. The second client can generate corresponding ciphertexts. The second client can send the generated ciphertexts to the server. The server can then forward the generated ciphertexts to the first client. The first client using the generated ciphertexts can compute a final encrypted comparison bit. The first client can then send the final encrypted comparison bit to the server.

In a second aspect, a server receives, from each of a plurality of pairs of clients, a corresponding data values encrypted using a common threshold public key. The server then can determined a median of the data values. Thereafter, the server homomorphically computinges a ciphertext encrypting the median of the data values. The ciphertext is then distributed to the clients so that the clients can jointly decrypt the ciphertext to determine the median.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for the computation of a median for diverse private data sets while, at the same time, preserving the confidentiality of the underlying data.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
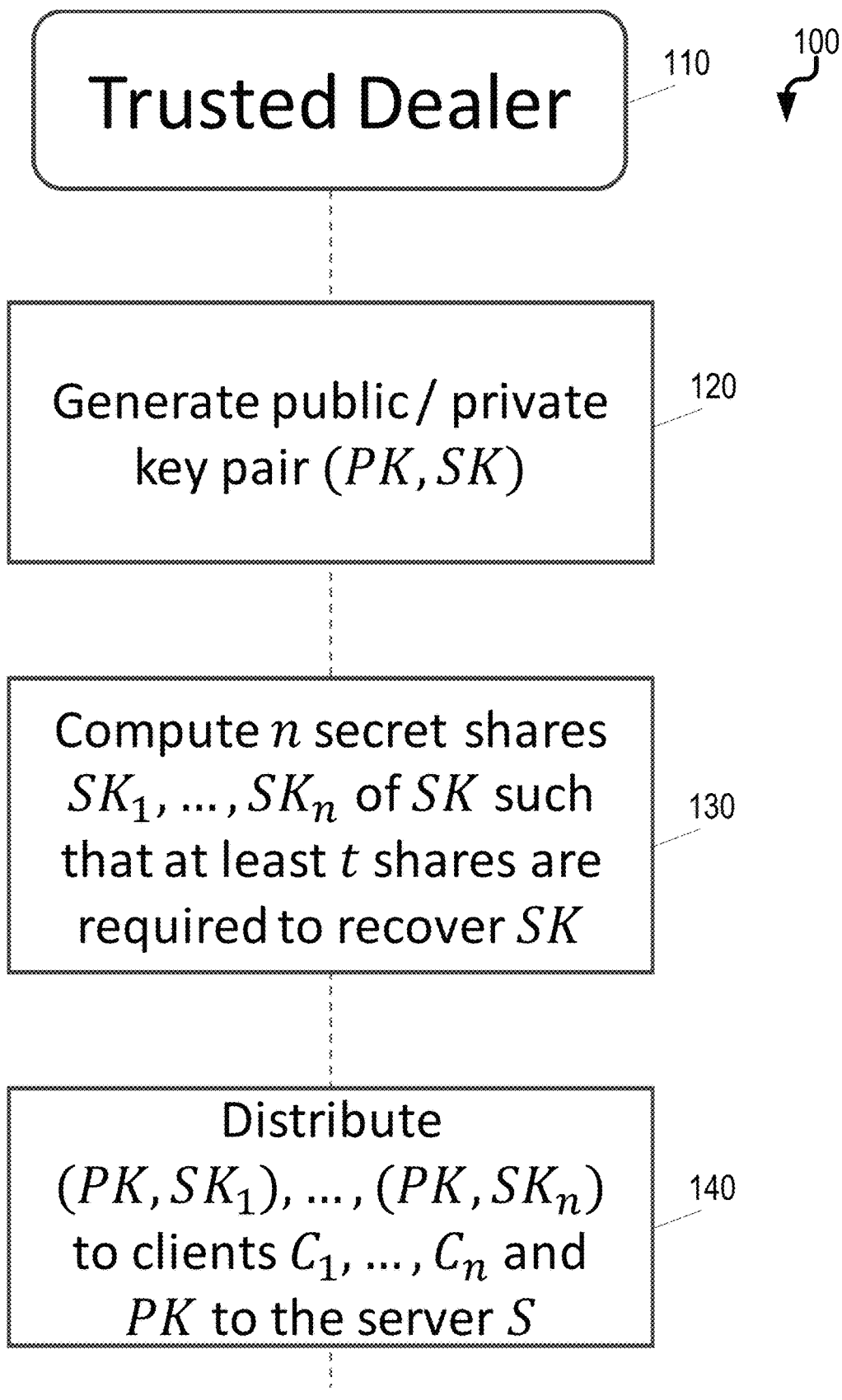
FIG. 1 is a process flow diagram illustrating generation of public/private key pairs by a client, and the distribution of public keys to the clients.

The current subject matter is directed to securely computing the median of the union of many private datasets. This is a special case of the problem of computing the k-th ranked element. It is an instance of secure multiparty computation protocol where several parties wish to compute a public known function on their private input while revealing only the output of the computation to a designated subset of parties and nothing else. The computation of the k-th ranked element is of particular interest in settings such as collaborative benchmarking where the individual datasets may contain proprietary information, yet where the kth-ranked element is of mutual interest to the participating companies.

A service provider as described herein can be characterized as an organization which offers server-based services to its customers. It may control several servers running the service or parts of it, by acting as software as a service (SaaS) provider. During the multi-party computation of the median computation protocols, the service provider is a regular participant without any input, and it is therefore not allowed to learn plaintext KPIs from the participants. This means the service provider remains oblivious in the computation process. As in a star network, the clients can only communicate with the service provider, but never amongst each other directly. It is also beneficial to keep anonymity among the participants, which can only be guaranteed, if they do not need to address messages to each other directly. The explicit requirement for anonymity is that a subscriber does not know (or refer to) any static identifier of other subscribers (e.g. IP addresses, public keys, etc.). Any static identifier can disclose the composition of the peer group to the subscribers, and it may break the privacy of the complete system.

The current subject matter is directed to the use of threshold homomorphic encryption including two efficient protocols for securely and privately computing the median with the help of an oblivious central server: namely threshold additive homomorphic encryption (TH-AHE) and threshold fully homomorphic encryption approach (TH-FHE).

With TH-AHE as provided herein, parties (i.e., client computing devices, etc.) share the private key of an additive homomorphic encryption scheme. The clients use the common public key to send their encrypted input to the server. The clients can compare their input pairwise using DGK (Damgard, Geisler and Kroigaard) comparison and the help of the server. The comparison results can then be revealed to the server encrypted with the common public key. The server homomorphically computes the ciphertext encrypting the median and runs a threshold decryption with the help of the clients. Instantiating this scheme with ElGamal encryption on an elliptic curve can result in a more efficient protocol.

With TH-FHE as provided herein, parties can share the private key of a fully homomorphic encryption scheme. They parties use the common public key to send their encrypted input to the server. The server homomorphically compares the inputs, computes the rank of each input and computes the ciphertext encrypting the median of the encrypted clients' inputs. Finally, the parties only interact to jointly decrypt the result. This scheme is efficient in the number of rounds (only 2), in communication and in client computation. The computation at the server is highly parallelizable.

Secure multiparty computation (SMC) can allows n parties $P_1, \ldots, P_n$, with private input $x_1, \ldots, x_n$ to compute the function $y=f(x_1, \ldots, x_n)$ such that only y is revealed and nothing else. Security in SMC is defined by comparison to an ideal model in which a trusted third party (TTP) receives $x_1, \ldots, x_n$ computes and outputs $y=f(x_1, \ldots, x_n)$. The parties can emulate the ideal model by executing a cryptographic protocol. A SMC protocol is then said to be secure if the adversary can learn only the result y and nothing else. Security models can be semi-honest and malicious. Semi-honest adversaries follow the protocol but try to learn more information, while malicious adversaries may deviate from the protocol specification.

A homomorphic encryption (HE) scheme as provided herein is an encryption scheme that allows computations on ciphertexts by generating an encrypted result whose decryption matches the result of a function on the corresponding plaintexts. A HE scheme as provided herein can include the following:

PK, SK, EK←KeyGen($\lambda$): The probabilistic key generation algorithm takes a security parameter $\lambda$ and generates a public key PK and the corresponding private key SK and an evaluation key EK.

c←Enc(PK, m): The probabilistic encryption algorithm encrypts a message m using the public key PK producing a ciphertext c.

m'←Dec(SK, c): The deterministic decryption algorithm decrypts a ciphertext c using the private key SK producing a message m'.

c←Eval(EK, $f$, $c_1, \ldots, c_n$): The evaluation algorithm takes the evaluation key EK, an n-ary function f and n ciphertexts $c_1, \ldots, c_n$ and returns a ciphertext c.

For each message m and for each message tuple $m_1, \ldots, m_n$ such that $c_i$=Enc(PK, $m_i$), the following correctness conditions can apply:

Dec(SK,ENC(PK,$m$))=$m$.

Eval(EK,$f$,$c_1, \ldots, c_n$)=Enc(PK,$f(m_1, \ldots, m_n)$).

If the evaluation algorithm allows only the addition as function then the scheme can be characterized as additively homomorphic encryption (AHE) (e.g., Paillier, etc.). If the evaluation algorithm allows only the multiplication as function then the scheme is multiplicatively homomorphic encryption (e.g., RSA, ElGamal, etc.). If the evaluation algorithm allows both addition and multiplication, then the scheme is fully homomorphic encryption (FHE).

Threshold Homomorphic Encryption (THE) as provided herein allows for the sharing of the private key to the parties such that a subset of parties is required for decryption. Formally, let ID={ . . . , idi, . . . } be the set of identities of the n clients (1≤i≤n). A THE scheme includes:

PK, SK, EK←KeyGen($\lambda$,t,ID): The probabilistic key generation algorithm takes a security parameter $\lambda$ and generates a public key PK, the corresponding private key SK and an evaluation key EK. It also generates n shares $\mathbb{SK} = \{SK_1, \ldots, SK_n\}$ of the private key SK, such that t share can be used to recover SK. $\mathbb{SK}$ c←Enc(PK, m): The encryption algorithm encrypts a message m using the public key PK producing a ciphertext c.

m'$_i$←Dec(SK$_i$, c): The partial decryption algorithm takes a ciphertext c and a share SK$_i$∈$\mathbb{SK}$ of the private key and outputs a share m'$_i$ of a message m'.

m'←Rec($\mathbb{M}_t$): The reconstruction algorithm takes a subset $\mathbb{M}_t = \{m'_{i_1}, \ldots, m'_{i_t}\} \subseteq \{m'_1, \ldots, m'_n\}$ of partial decryption shares and outputs a message m'. We have a correctness condition:

m=Rec(Dec(SK$_{i_1}$,Enc(PK,m)), . . . ,Dec(SK$_{i_t}$,Enc(PK, m)))

and a security condition of IND-CPA security. Furthermore, there is a homomorphic property:

Eval(EK,f,c$_1$, . . . ,c$_n$)=Enc(PK,f(m$_1$, . . . ,m$_n$)).

When used in a protocol, the party (i.e., computing device) that is responsible to execute the reconstruction algorithm can be referred to as the combiner. Depending on the protocol, the combiner can be any protocol participant or a server. The combiner can receive a set $\mathbb{M}_t = \{m_{j_1}, \ldots, m_{j_t}\}$ of ciphertexts, runs m←Rec($\mathbb{M}_t$) and publishes the result or moves to the next step of the protocol specification.

Mean, median, and mode are measures of central tendency. These measures provide an overall indication of how a population looks like. The median value refers to the division of the data set into two halves. To compute the median of any dataset the dataset values are sorted in ascending order. Then there are two possibilities depending on the size of the dataset, either it can be even or odd. When the size of the dataset is odd, the median is exactly the middle value of the sorted dataset. Otherwise, the median is calculated by computing the mean of the two middle values.

Formally, let $x_1, x_2, \ldots, x_n$ be the n data values. To determine the median, the data values are sorted in ascending order. If n is odd, then the median is the value that lies exactly in the middle of the dataset. That is, the median m is the data value at the position $$\frac{n+1}{2}$$

of the ordered list:

$$m = x_{\frac{n+1}{2}}$$

In the even case, the median is the mean of the two middle values of the ordered list. That is, m is the mean of the data values in positions $$\frac{n}{2} \text{ and } \frac{n}{2} + 1$$

of the ordered list:

$$m = \frac{x_{\frac{n}{2}} + x_{\frac{n}{2}+1}}{2}.$$

The distinction between the even and odd cases can be avoided by the setting the middle as $$\lceil \frac{n}{2} \rceil.$$

The median is a fundamental business operation in the collaborative benchmarking. It facilitates to compute the mutual interest of peers. In the context of the current subject matter, the median can be calculated for n (n≥2) confidential datasets in the service provider model. This computation can be important for many different scenarios. For example, several companies may wish to compute the median salary of their employees without revealing to each other their individual salaries. In another example, a number of different hospitals may be interested in determining the median life expectancy of their patients affected by a particular disease without revealing to each other their private information. In the airline industry, competitive airlines may want to determine the median maintenance cost of their aircraft parts, where the individual number of aircraft parts and maintenance cost are private.

A computation model can be implemented using two mutually distrustful servers. The clients can submit their inputs to one server only using a special proxy Oblivious Transfer protocol. The overall protocol can, for example, used a GC protocol in which one server creates and encrypts the circuit and the other server evaluates the circuit. Multiple servers lead to different business models for the service provider of a privacy-preserving service. The service provider can share benefits with an almost equal peer offering its computational power. In the one server model the service provider can offer the service by himself. In practice, it can be very difficult to verify that two servers are really organizationally separated, although arrangement can be provided such that special service providers are dedicated for privacy-preserving services as described herein.

In a server-aided privacy-preserving protocol as provided herein, the server can be a regular participant without any input. While privacy protects the confidentiality of the KPIs for the companies, it alleviates the server from the burden of storing and handling them and protects it from potential embarrassment due to accidental revelation. Another important aspect of the service provider model is that the subscribed companies only communicate with the service provider, but never amongst each other. Anonymity among the subscribed companies is a beneficial feature and can only be achieved, if they do not need to address messages to each other. The precise requirement for anonymity is that subscribers do not know or refer to any static identifier of other customers (e.g., IP addresses, public keys, etc.).

The protocol runs between n clients and one server. The clients can communicate only through the server which has no input and must remain oblivious, i.e. the server should not learn clients' inputs. The scheme consists of two main steps. In the initialization, parties generate and exchange necessary cryptographic keys through the server. The main protocol allows the clients with the help of the server to run a sorting protocol. This then allows to compute the rank of each element and later the median. After the protocol the parties should learn only the expected result and nothing else. The protocol is secure in the semi-honest model, hence it can be assumed that the parties follow the protocol specification, but may try to learn more information than allowed.

A secure median protocol (SM-AHE) based on threshold additive homomorphic encryption is provided herein. Threshold homomorphic encryption allows the clients to share the private key such that a subset of clients is required for decryption.

The initialization requires a trusted dealer that is not allowed to participate in the main protocol. This step is also called the dealing phase in which the trusted dealer D generates a public/private key pair (PK, SK) for an additively homomorphic encryption. Then the private key SK is split in n shares $SK_1, \ldots, SK_n$ such that at least t shares are required to reconstruct SK. Finally, the trusted dealer distributes the n shares $SK_1, \ldots, SK_n$ to the n clients (client $C_i$ receiving $SK_i$) and delete any local memory referring to the secret key and the secret shares. However, in some variations, a protocol is provided, it is also possible to run a protocol, that allows each client to choose a secret $SK_i$ and to jointly compute a common PK with other clients such that at least t clients are required for the decryption. The dealing phase depends on the underlying homomorphic encryption. Additionally, each client $C_i$ generates its own public/private key pair ($pk_i, sk_i$) and sends the public key to the server. The server then distributes the $pk_i$ to all clients.

With an efficient comparison protocol, let x and y be two l-bit integers, $x = x_l \ldots x_1$ and $y = y_l \ldots y_1$ be their binary representations, where $x_l, y_l$ are the more significant bits. To determine whether $x \leq y$ or $x > y$, one computes for each $1 \leq i \leq l$ the following numbers $z_i$:

$$z_i = \delta + x_i - y_i + 3 \sum_{j=i+1}^{l} (x_j \oplus y_j). \quad (1)$$

The sum of exclusive-ors $\sum_{j=i+1}^{l} x_j \oplus y_j$) will be zero exactly when $x_j = y_j$ for $i < j \leq l$. The variable s can be set to either 1 (when checking $x \leq y$) or −1 (when checking $x > y$) and allows for secret-sharing the result of the comparison between two parties. Assume a party A has a private input x and a public/private key pair ($pk_A, sk_A$) of an AHE. Party A will be called Generator. Another party B has a private input y and knows only $pk_A$. Party B we be called Evaluator. For simplicity, let $[\![x]\!]$ denote $Enc(pk_A, x)$. To check whether $x \leq y$ holds the protocol works as follows:

A sends $[\![x_l]\!], \ldots, [\![x_1]\!]$ to party B

B computes a function $D_{GK}E_{VAL}([\![x_l]\!], \ldots, [\![x_1]\!])$ as follows:

-continued $$\forall i(1 \leq i \leq l) : [\![x_i \oplus y_i]\!] := \begin{cases} [\![x_i]\!] & \text{if } y_i = 0 \\ [\![1]\!] \cdot [\![x_i]\!]^{-1} & \text{if } y_i = 1 \end{cases}$$

Choose a random bit $\delta_B$ and set $s := 1 - 2 \cdot \delta_B$ $$\forall i(1 \leq i \leq l) : [\![z_i]\!] := [\![s]\!] \cdot [\![x_i]\!] \cdot [\![y_i]\!]^{-1} \cdot \left(\prod_{j=i+1}^{i} [\![x_i \oplus y_i]\!]\right)^3$$

Blind the number $[\![z_i]\!] : \forall i(1 \leq i \leq l) : [\![z_i]\!] := [\![z_i]\!]^{r_i}$, for a random $r_i$ Set $([\![z_1']\!], \ldots, [\![z_l']\!]) := \pi([\![z_1]\!], \ldots, [\![z_l]\!])$, where $\pi$ is a permutation Return $\delta_B$ and $([\![z_1']\!], \ldots, [\![z_l']\!])$ B sends $([\![z_1']\!], \ldots, [\![z_l']\!])$ to A and outputs $\delta_B$ A computes a function $D_{GK}D_{ECRYPT}([\![z_1']\!], \ldots, [\![z_l']\!])$ as follows:

$$\delta_A := D_{GK}D_{ECRYPT}([\![z_1']\!], \ldots, [\![z_l']\!]) = \begin{cases} 1 & \text{if } \exists i : Dec(sk, [\![z_i']\!]) = 0 \\ 0 & \text{else} \end{cases}$$

After the computation the parties A and B hold random bits $\delta_A$ and $\delta_B$ and it holds $\delta_A \oplus \delta_B =$ ($x \leq y$). For more details, we refer to the literature [12, 23].

For simplicity, let $[\![m]\!]_i = Enc(pk_i, m)$ and $[\![x]\!] = Enc(PK, m)$. For an l-bit integer x, we use $[\![x]\!]$ to denote the ciphertext of the integer representation of x and ($[\![x_l]\!], \ldots, [\![x_1]\!]$) to denote the ciphertext of the binary representation $x_l \ldots x_1$ of x. Each party $C_i$ encrypts the integer representation of its input $x_i$ under the common public key PK and the binary representation of $x_i$ under its own public key $pk_i$ and sends these ciphertexts to the server. Hence encrypts the integer representation of its input x under the common public key PK and the binary $C_i$ sends $[\![x]\!]$ and ($[\![x_{il}]\!]_i, \ldots, [\![x_{i1}]\!]_i$) to the server as illustrated in step 2 of protocol 5.

With step 2, pairs of clients run the DGK comparison protocol through the server which is only used to forward messages as we do not have direct link between clients. Algorithm 1 below can be used to pair clients and set the role of each client in a pair.

---

Algorithm 1 PAIRED Predicate

1: function PAIRED (i, j)
2: return (i = 1 (mod 2) $\wedge$ j < i $\wedge$ j = 1 (mod 2) $\vee$
  i = 1 (mod 2) $\wedge$ j > i $\wedge$ j = 0 (mod 2) $\vee$
  i = 0 (mod 2) $\wedge$ j < i $\wedge$ j = 0 (mod 2) $\vee$
  i = 0 (mod 2) $\wedge$ j > i $\wedge$ j = 1 (mod 2)

---

The comparison is illustrated in Protocol 2 below. If a pair (i,j) satisfies the PAIRED predicate (Algorithm 1), then client $C_i$ runs the DGK protocol as generator and client $C_j$ is the evaluator. After the computation, parties $C_i$ and $C_j$ get shares $\delta_i$ and $\delta_j$ of the result, which is encrypted under the common public key as $[\![\delta_i \oplus \delta_j]\!]$ and revealed to the server.

---

Protocol 2 DGK Comparison Protocol

1: function DGKCOMPARE(i, j)
2: if PAIRED(i, j) then
3:     S → $C_j$: $[\![x_{i1}]\!]_i, \ldots, [\![x_{il}]\!]_i$
4:     $C_j$: $\delta_{ji}$, ($[\![z_{i1}]\!]_i, \ldots, [\![z_{il}]\!]_i$) ← DGKEVAL($[\![x_{i1}]\!]_i, \ldots [\![x_{il}]\!]_i$)
5:     $C_j$ → S: $[\![z_{i1}]\!]_i, \ldots, [\![z_{il}]\!]_i, [\![\delta_{ji}]\!]$
6:     S → $C_i$: $[\![z_{i1}]\!]_i, \ldots, [\![z_{il}]\!]_i, [\![\delta_{ji}]\!]$
7:     $C_i$: $\delta_{ji}$ ← DGKDECRYPT($[\![z_{i1}]\!]_i, \ldots, [\![z_{il}]\!]_i$)

| Protocol 2 DGK Comparison Protocol |
| --- |
| 8:  $C_i \to S$: $[\![\delta_{ij} \oplus \delta_{ji}]\!]$ |
| 9:  return $(\delta_{ij}, \delta_{ji}, [\![\delta_{ij} \oplus \delta_{ji}]\!])$ |

The main scheme for computing the median is described in Protocol 5 and starts by requiring the clients to upload their ciphertexts (step 2) as described above. Then in step 4, the parties run the DGK comparison using Protocol 2.

After all admissible comparisons have been computed, the server can use algorithm 3 to compute the rank for each input $x_i$ by just homomorphically adding the comparison results involving $x_i$. Let $[\![r_i]\!]$ be a ciphertext initially encrypting 0 and let $b_{ij}=\delta_{ij}\oplus\delta_{ji}$. For each j, if PAIRED(i,j) is true then the server computes $[\![r_i]\!] \leftarrow [\![r_i+b_{ij}]\!]$. Otherwise $[\![r_i]\!] \leftarrow [\![r_i+1-b_{ij}]\!]$ can be computed.

Now the server has the encrypted rank $[\![r_1]\!], \ldots, [\![r_n]\!]$, where exactly one $[\![r_i]\!]$ encrypts $$k = \lceil \frac{n}{2} \rceil.$$

In order to determine the element whose rank is k, the server then computes $R_i = ([\![r_i]\!] \cdot [\![k]\!]^{-1})^{\alpha_i} \cdot [\![x_i]\!] = [\![(r_i-k)\alpha_i+x_i]\!]$ for all i. $\alpha$ can be chosen such that $1<|\alpha|<\lambda$, where $|\alpha|, |n|$ are the bit length of $\alpha$, n and $\lambda$ is the bit length of any ciphertext. Therefore, for the ciphertext $[\![r_i]\!]$ encrypting k, $R_i$ is equal to $[\![x_i]\!]$. Otherwise $R_i$ encrypts a random plaintext.

| Algorithm 3 TH-AHE Median Computation |
| --- |
| 1:  function AHECOMPUTEMEDIAN($[g_{i,j}]_{1\le i,j\le n}$, k) |
| 2:    for i := 1 to n do |
| 3:      $[\![r_i]\!] \leftarrow [\![0]\!]$ |
| 4:      for j := 1 to n do |
| 5:        if PAIRED(i, j) then |
| 6:          $[\![r_i]\!] \leftarrow [\![r_i]\!] \cdot g_{ij}$ |
| 7:        else |
| 8:          $[\![r_i]\!] \leftarrow [\![r_i]\!] \cdot [\![1]\!] \cdot g_{ji}^{-1}$ |
| 9:    for i := 1 to n do |
| 10:     $R_i = [\![r_i]\!] \leftarrow ([\![r_i]\!] \cdot [\![k]\!]^{-1})^{\alpha_i} \cdot [\![x_i]\!]$ |
| 11:   return R |

In step 8 of Protocol 5, the server distributes the result $R_1, \ldots, R_n$ of Algorithm 3 to the clients for threshold decryption. The ciphertexts each client must decrypt are computed by the server using algorithm 4 below. Proposition 1 shows that the ciphertexts generated from Algorithm 4 allow for the correct decryption of $R_1, \ldots, R_n$. The first part shows that each client receives exactly a subset of t elements of $\{R_1, \ldots, R_n\}$. The second part shows that each $R_i$ will be distributed to exactly t different clients which allows a correct threshold decryption.

Proposition 1: Let $S=\{a_1, \ldots, a_n\}$, $t \le n$ and $S_i = \{a_{i-t+1}, \ldots, a_i\}$, $1 \le i \le n$, where the indexes in $S_i$ are computed modulo n. Then:

(i) Each subset $S_i$ contains exactly t elements of S and
(ii) Each $a \in S$ is in exactly t subsets $S_i$.

Proof: It is clear from the definition that $S_i \subseteq S$ for all i and since $i-(i-t+1)+1=t$, $S_i$ has exactly t elements. Let $a_i$ be in S, from the definition $a_i$ is element of only the subsets $S_i$, $S_{i+1}, \ldots, S_{i+t-1}$, where the indexes of the $S_i$ are computed modulo n. Again, $(i+t-1)-i+1=t$ shows that $a_i$ is in exactly t subsets.

| Algorithm 4 TH-AHE Decryption Request |
| --- |
| 1:  function DECREQUEST($[R_j]_{1\le j \le n}$, i, $\pi$) |
| 2:    Let $M^{(i)}$ be an arrays of size t |
| 3:    for w := i - t + 1 to i do |
| 4:      u ← $\pi$(w mod n) |
| 5:      $M_u^{(i)} = R_u$ |
| 6:      $I^{(i)} = I^{(i)} \cup \{u\}$ |
| 7:    return $(M^{(i)}, I^{(i)})$ |

In the remaining steps of Protocol 5, the server receives the partial decryption from the clients (step 10), recombines them (step 12) and selects the plaintext whose bit length is smaller or equal to l as the median (step 13) and sends it to the clients (step 15).

| Protocol 5 SM-AHE Protocol |
| --- |
| 1:  for i = 1 to n do |
| 2:    $C_i \to S$: $[\![x_i]\!], [\![x_{il}]\!]_i, \ldots, [\![x_{i1}]\!]_i$ |
| 3:  for i, j := 1 to n do |
| 4:    $C_i, C_j, S$: $(\delta_{ij}, \delta_{ji}, g_{ij} = [\![\delta_{ij} \oplus \delta_{ji}]\!]) \leftarrow$ DGKCOMPARE(i, j) |
| 5:    S: let $[R_j]_{1\le j \le n} \leftarrow$ AHECOMPUTEMEDIAN$\left([g_{ij}]_{1\le i,j \le n}, \lceil \frac{n}{2} \rceil \right)$ |
| 6:  S: let $\pi$ be a random permutation of $\{1, \ldots, n\}$ |
| 7:  for i = 1 to n do |
| 8:    $S \to C_i$: $(M^{(i)}, I^{(i)}) \leftarrow$ DECREQUEST($[R_j]$, i, $\pi$) |
| 9:  for i =1 to n do |
| 10:   $C_i \to S$: $h_j^{(i)} \leftarrow$ Dec($SK_i, M_j^{(i)}$), j ∈ $I^{(i)}$ |
| 11: for j := 1 to n do |
| 12:   S: $\tilde{x}_j \leftarrow$ Rec($h_j^{(i1)}, \ldots h_j^{(it)}$) |
| 13: S: let j' \| log($\tilde{x}_{j'}$) ≤ l; m ← $\tilde{x}_{j'}$ |
| 14: for i := 1 to n do |
| 15:   $S \to C_i$: m |

The following describes the use of SM-FHE. With this variation, the plaintext values are, therefore, encrypted using FHE. Hence, $[\![x]\!]$ now represents an FHE ciphertext of the plaintext x. The notation of the algorithm Eval can be as follows:

$$\text{Eval}(EK, f, [\![x_1]\!], \ldots, [\![x_n]\!]) = [\![f(x_1, \ldots, x_n)]\!],$$

where $f$ is the function to be applied on the encrypted data.

Let x, y be two l-bit integers with binary representation $x_l \ldots x_1, y_l \ldots y_1$. To check whether x is greater than y, one can evaluate the following circuit $$c_i = \begin{cases} (1 \oplus x_i) \cdot y_i & \text{if } i = 1 \\ ((1 \oplus x_i) \cdot y_i) \oplus ((1 \oplus x_i \oplus y_i) \cdot c_{i-1}) & \text{if } i > 1 \end{cases}$$

and the result of the comparison is the bit $c_l$ which is 0 if $x \geq y$ and 1 otherwise. This can be expressed recursively as follows:

$$c_l = (1 \oplus x_l) \cdot y_l \oplus \left( \bigoplus_{i=1}^{l-1} (1 \oplus x_i) \cdot y_i \cdot d_{i+1} \cdot d_{i+2}, \ldots, d_l \right),$$

where $d_j = (1 \oplus x_j \oplus y_j)$. The above comparison circuit has multiplicative depth $\log(l-1)+1$ and can be homomorphically evaluated on two l-bits integers in $O(l \log l)$ homomorphic computations. In the following, FHECOMPARE($[\![x]\!]$, $[\![y]\!]$) is used to denote the homomorphic evaluation of the comparison circuit.

The initialization is similar to the previous case with the difference that only the threshold key generation is required. Hence, there is a public key PK, whose corresponding private key SK is split in n shares $SK_1, \ldots, SK_n$ such that at least t shares are required to reconstruct SK. The shares of the private key are then distributed to the clients. The main protocol relies on the following proposition.

Proposition 2: Let $x_1, \ldots, x_n$ be n integers, $r_1, \ldots, r_n \in \{1, \ldots, n\}$ their corresponding rank and $f(x) = \Pi_{i=1, i \neq k}^{n}(x-i)$. Then, there is $\Sigma_{i=1}^{n} x_i \cdot f(r_i) = x_{i*}$, where $x_{i*}$ is the unique element with rank $r_{i*} = k$.

Proof. For all $r_i \in (1, \ldots, n)$, there is:

$$f(r_i) = \begin{cases} 0 & \text{if } r_i \neq k \\ 1 & \text{if } r_i = k \end{cases}$$

It follows that if $x_{i*}$ is unique with rank $r_{i*} = k$ then $\Sigma_{i=1}^{n} x_i \cdot f(r_i) = x_{i*}$.

The following relates to how the server can homomorphically compute the median from the ranks of the inputs. Assume the server has ciphertexts $[\![x_1]\!], \ldots, [\![x_n]\!]$ of plaintext $x_1, \ldots, x_n$ and the ciphertext $[\![r_1]\!], \ldots, [\![r_n]\!]$ of their corresponding rank. Moreover, assume the server knows only the public key used to encrypt the input and the evaluation key, but not the private key. The server can compute a ciphertext $[\![x_{i*}]\!]$ such that $r_{i*} = k, 1 \leq k \leq n$.

Let $f(x) = \Pi_{i=1, i \neq k}^{n}(x-i)$ be the polynomial with degree n-1 from Proposition 2. For each i the server can compute $[\![f(r_i)]\!]$ by first evaluating $[\![d_{ij}]\!] = [\![r_i - j]\!]$ for all j and then $[\![y_i]\!] = [\![\Pi_{j=1}^{n} d_{ij}]\!] = [\![f(r_i)]\!]$ which is equal $[\![1]\!]$ if $r_i = k$ and $[\![0]\!]$ otherwise. Finally, the server computes the encrypted inner product $[\![\Sigma_{i=1}^{n} x_i y_i]\!]$ of the two vectors ($[\![x_1]\!], \ldots, [\![x_n]\!]$), ($[\![y_1]\!], \ldots, [\![y_n]\!]$). If i* is such that $r_{i*} = k$ then we have $[\![\Sigma_{i=1}^{n} x_i y_i]\!] = [\![x_{i*}]\!]$.

The server computation is described in Algorithm 6. The algorithm gets fully homomorphic encrypted inputs, evaluates pairwise comparisons, computes the ranks and finally performs the computation described above to return the ciphertext of the element with rank k.

Algorithm 6 TH-FHE Media Computation

```
1:   function FHECOMPUTEMEDIAN([[ x_i ]]_{1≤i≤n}, k)
2:     for i := 1 to n do
3:       [[ b_ii ]] ← [[ 1 ]]
4:       for j := i + 1 to n do
5:         [[ b_ij ]] ← FHECOMPARE([[ x_i ]], [[ x_j ]])
6:         [[ b_ji ]] ← [[ 1 - b_ij ]]
7:       [[ r_i ]] ← [[ 0 ]]
8:       for j := 1 to n do
9:         [[ r_i ]] ← [[ r_i + b_ij ]]
10:    for i := 1 to n do
11:      [[ d_i0 ]] ← [[ f(k)^{-1} ]]
12:      for j := 1 to n do
13:        [[ d_ij ]] ← [[ r_i - j ]]
14:      [[ y_i ]] ← [[ Π_{j=0}^{n} d_ij ]]
15:    [[ x_i* ]] ← [[ 0 ]]
16:    for i := 1 to n do
17:      [[ x_i* ]] ← [[ x_i* + x_i · y_i ]]
18:    return [[ x_i* ]]
```

The complete SM-FHE scheme is described in Protocol 7. In the first step of the protocol each client $C_i$ just upload $[\![x_i]\!]$ encrypted under PK (step 2). Then the server runs algorithm 6 to get a ciphertext encrypting the median (step 3). In the remaining steps, the server runs a threshold decryption with a random set of t clients and reveals the final result.

Protocol 7 SM-FHE Protocol

```
1:   for i := 1 to n do
2:     C_i → S: [[ x_i ]]
3:   S: let [[ x_i* ]] ← FHECOMPUTEMEDIAN([[ x_i ]]_{1≤i≤n}, k}
4:   S: let I_t ← {1, ..., n} be a set of t random indexes
5:   for all i ∈ I_t do
6:     S → C_i: [[ x_i* ]]
7:   for all i ∈ I_t do
8:     C_i → S: s_i ← Dec(SK_i, [[ x_i* ]])
9:   S: let m ← Rec(s_1, ..., s_t)
10:  for i := 1 to n do
11:    S → C_i: m
```

FIGS. 1-6 provide further illustrations helpful for understanding the techniques described herein. FIG. 1 is a process flow diagram 100 illustrating threshold key generation by a trusted dealer 110 (e.g., a computing device, etc.) which is not allowed to take part to the secure median protocol. The trusted dealer 110 initially, at 120, generates a public/private key pair (PK, SK). Thereafter, at 130, the trusted dealer 110 computes n secret shares $SK_1, \ldots, SK_n$ of SK such that at least t shares are required to recover SK (the secret key). The trusted dealer 110 then, at 140, distributes the public key and respective private shares to clients $C_1, \ldots, C_n$ and the public key to a server S.

Figure 2:
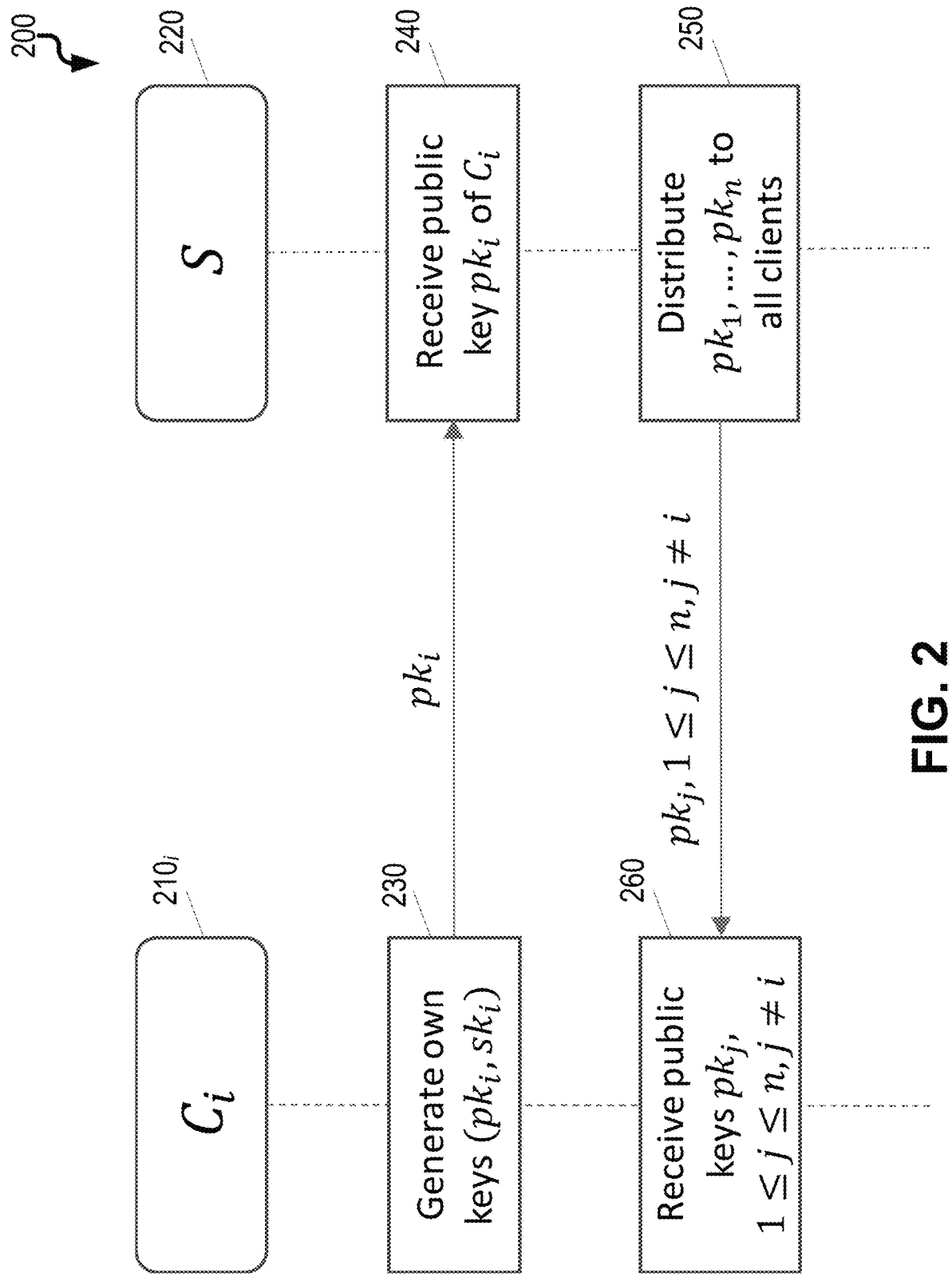
FIG. 2 is a process flow diagram illustrating distribution of public/private key pairs to clients.

FIG. 2 is a process flow diagram 200 illustrating interaction between a client, $210_i$ and a server 220. Initially, at 230, each client $210_i$ generates its respective public/private key pair and, at 240, sends its public key, at 240, to the server 220. The server 220, at 250, then distributes the public keys received from all of the clients $210_{1 \ldots n}$ to the respective clients (at 260) omitting, for each client $210_i$ its respective public key.

Figure 3:
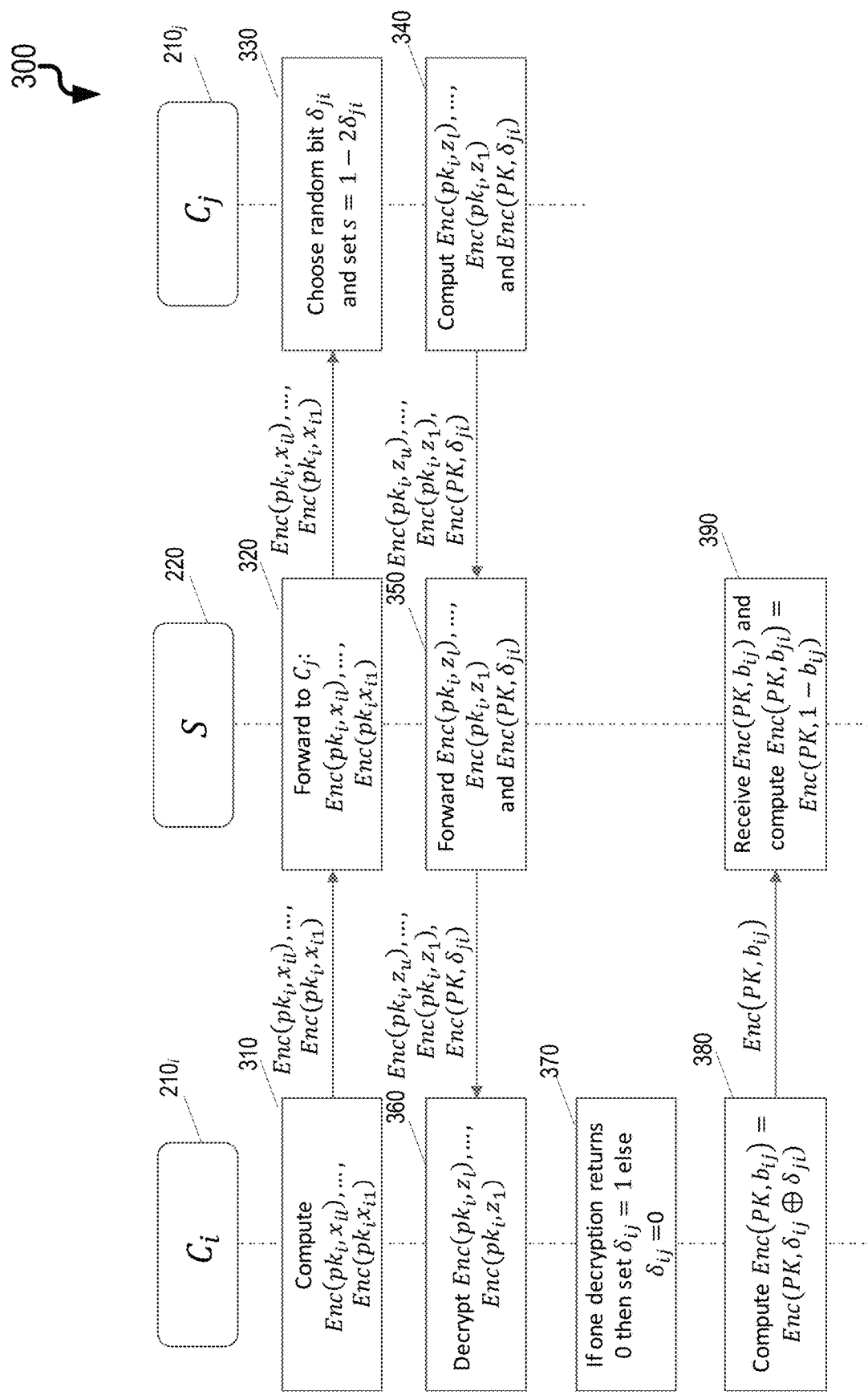
FIG. 3 is a process flow diagram illustrating a DGK comparison protocol process as used herein.

FIG. 3 is a process flow diagram 300 illustrating interaction among a first client $210_i$, the server 220, and a second client $210_j$ as part of a DGK comparison protocol. This diagram 300 corresponds to Protocol 2 above. With this arrangement, client Ci $210_i$ knows its own private input $x_i$, the threshold public key PK, its share of the secret key $SK_i$, its own public/private key (pk$_i$, sk$_i$), the public keys of all other clients 210. The input $x_i$ has bit representation $x_{il} \ldots$ $x_{i1}$. The server 220 knows all public keys PK, $pk_1, \ldots, pk_n$. Initially, at 310, the client 210$_i$ encrypts bitwise (i.e., for each single bit, a ciphertext is generated) the data value $x_i$ of interest using its own public key $pk_i$, and sends the encrypted bits $Enc(pk_i, x_{il}), \ldots, Enc(pk_i, x_{i1})$ to the server 220. The server 220 then, at 320, forwards the encrypted data bits to a second client 210$_j$. The second client 210$_j$ then, at 330, chooses a random bit $\delta_{ji}$ and computes $s=1-2\delta_{ji}$. The random bit $\delta_{ji}$ is used to secret share the result of the comparison with client 210$_i$. Then client 210$_j$, at 340, homomorphically evaluates a comparison circuit on its own input bits $x_{jl} \ldots x_{j1}$ and the encrypted bits $Enc(pk_i, x_{il}), \ldots, Enc(pk_i, x_{i1})$ by computing ciphertexts $Enc(pk_i, z_l), \ldots, Enc(pk_i, z_1)$, where $z_u = s + x_{iu} - x_{ju} + 3\Sigma_{v=u+1}^{l} x_{iv} \oplus x_{jv}$, $1 \leq u \leq l$. At 340, the ciphertexts $Enc(pk_i, z_l), \ldots, Enc(pk_i, z_1)$ and $Enc(PK, \delta_{ji})$ are sent back to the server 220 and forwarded to client 210$_i$ at 350. At 360, client 210$_i$ decrypts the ciphertexts $Enc(pk_i, z_l), \ldots, Enc(pk_i, z_1)$. At 370, client 210$_i$ sets $\delta_{ij}=1$ if one decryption at 360 has returned 0, otherwise $\delta_{ij}=0$. At 380, client 210$_i$ computes $Enc(PK, \delta_{ij} \oplus \delta\_ji)$, as the final encrypted comparison bit between $x_i$ and $x_j$, and sends it back to the server 220. Finally, at 390 the server 220 receives the encrypted comparison bit $Enc(PK, \delta_{ij} \oplus \delta_{ji}) = Enc(PK, b_{ij})$ and uses it to compute $Enc(PK, b_{ji}) = Enc(PK, 1-b_{ij})$.

Figure 4:
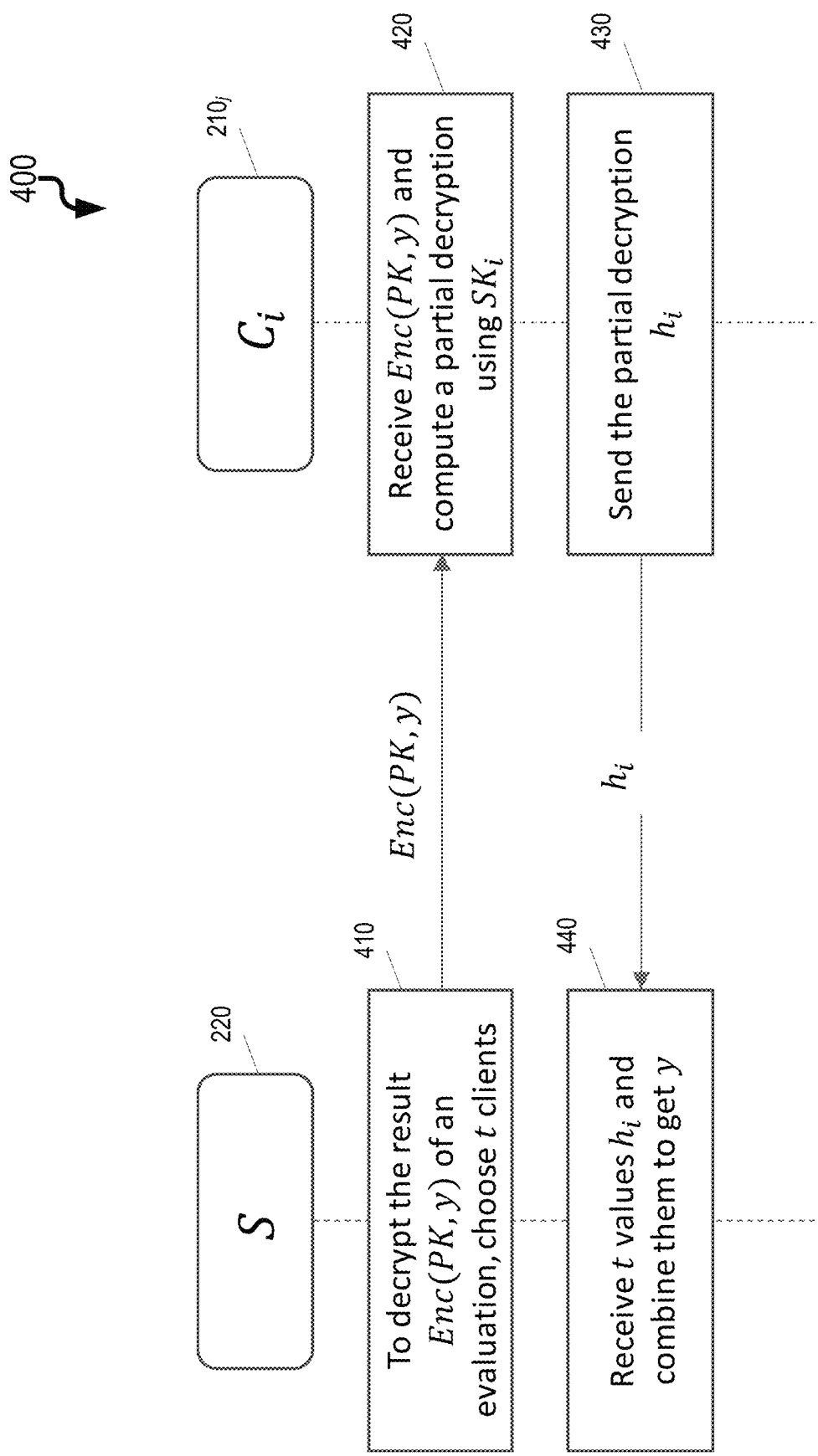
FIG. 4 is a process flow diagram illustrating threshold decryption in which t shares of a private key are required to decrypt an encrypted value.

FIG. 4 is a process flow diagram 400 illustrating interaction between the client 210; and the server 220. In particular, this diagram 400 relates to threshold decryption as used in Protocol 5 (Steps 8 and 10). Initially, the server 220, at 410, chooses t clients to decrypt the result $Enc(PK, y)$ of an evaluation (i.e., $Enc(PK, y)$ is ciphertext as computed by Algorithm 3). The client 210$_i$, at 420, receives the result $Enc(PK, y)$ and computes a partial decryption using $SK_i$ (Step 8). The client 210$_i$ then, at 430, sends the partial decryption $h_i$ to the server 220 (Step 10). The server 220, at 440, receive t values $h_i$ from the participating clients 220 combine them to get y.

Figure 5:
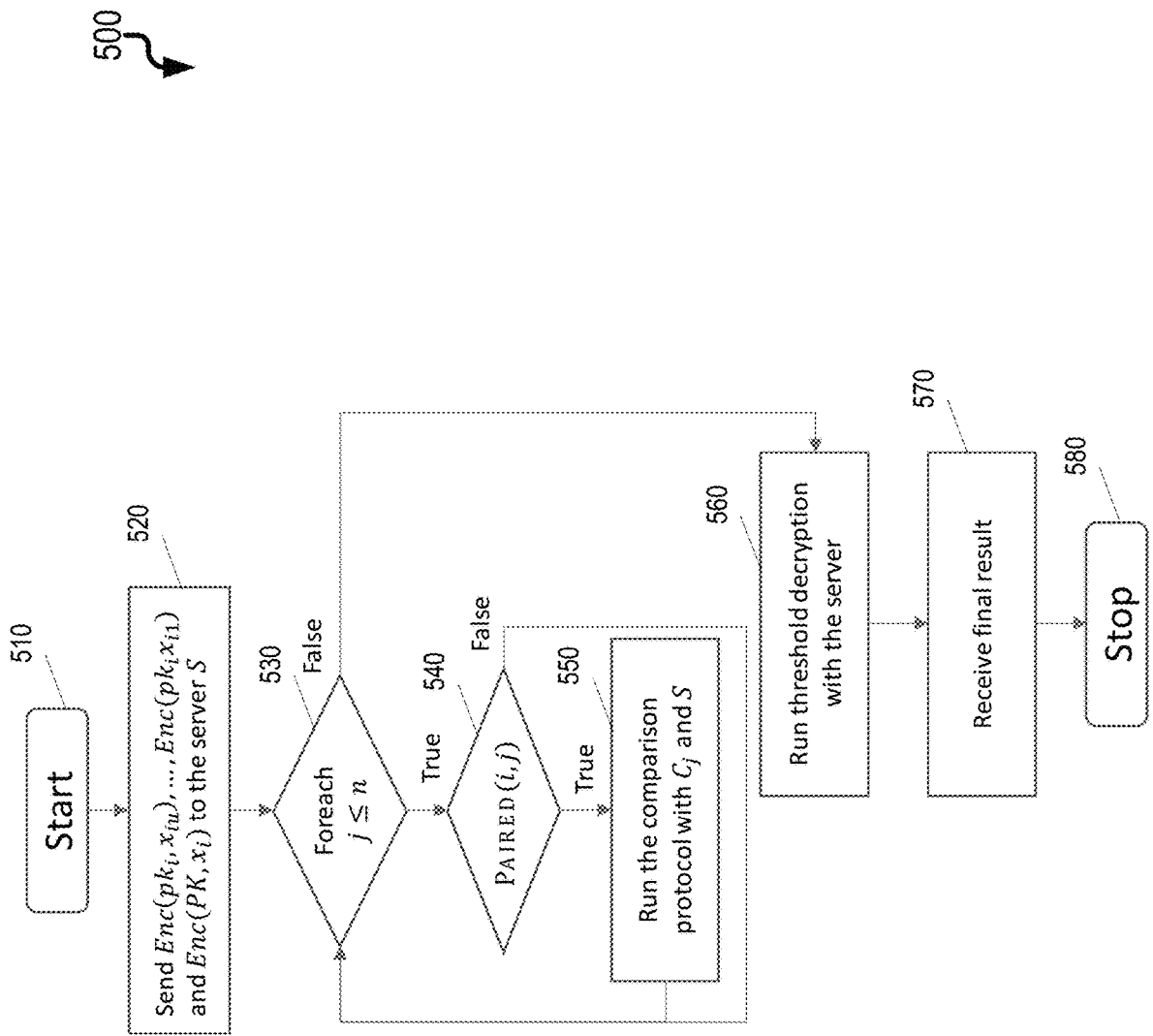
FIG. 5 is a process flow diagram illustrating the secure computation of a median of datasets from a client perspective.

FIG. 5 is a process flow diagram 500 that relates to the activities of the client 210 as part of Protocol 5 shown above. The process starts, at 510, with the client 210, at 520, sending the encrypted dataset for analysis to the server 220. A loop commences, at 530, that iterates for each client. If, at 540, a pair of clients (i,j) satisfies the PAIRED predicate (Algorithm 1), then, at 550, client $C_i$ runs the DGK protocol as generator and client $C_j$ is the evaluator. After the computation, clients $C_i$ and $C_j$ get shares $\delta_{ij}$ and $\delta_{ji}$ of the result, which is encrypted under the common public key as $[\![ \delta_{ij} \oplus \delta_{ji} ]\!]$ and revealed to the server 220. The server 220 can then, at 560, run the threshold decryption using the encrypted results received from the clients 220 and, at 570, the final result is provided, and the process can terminate at 580.

Figure 6:
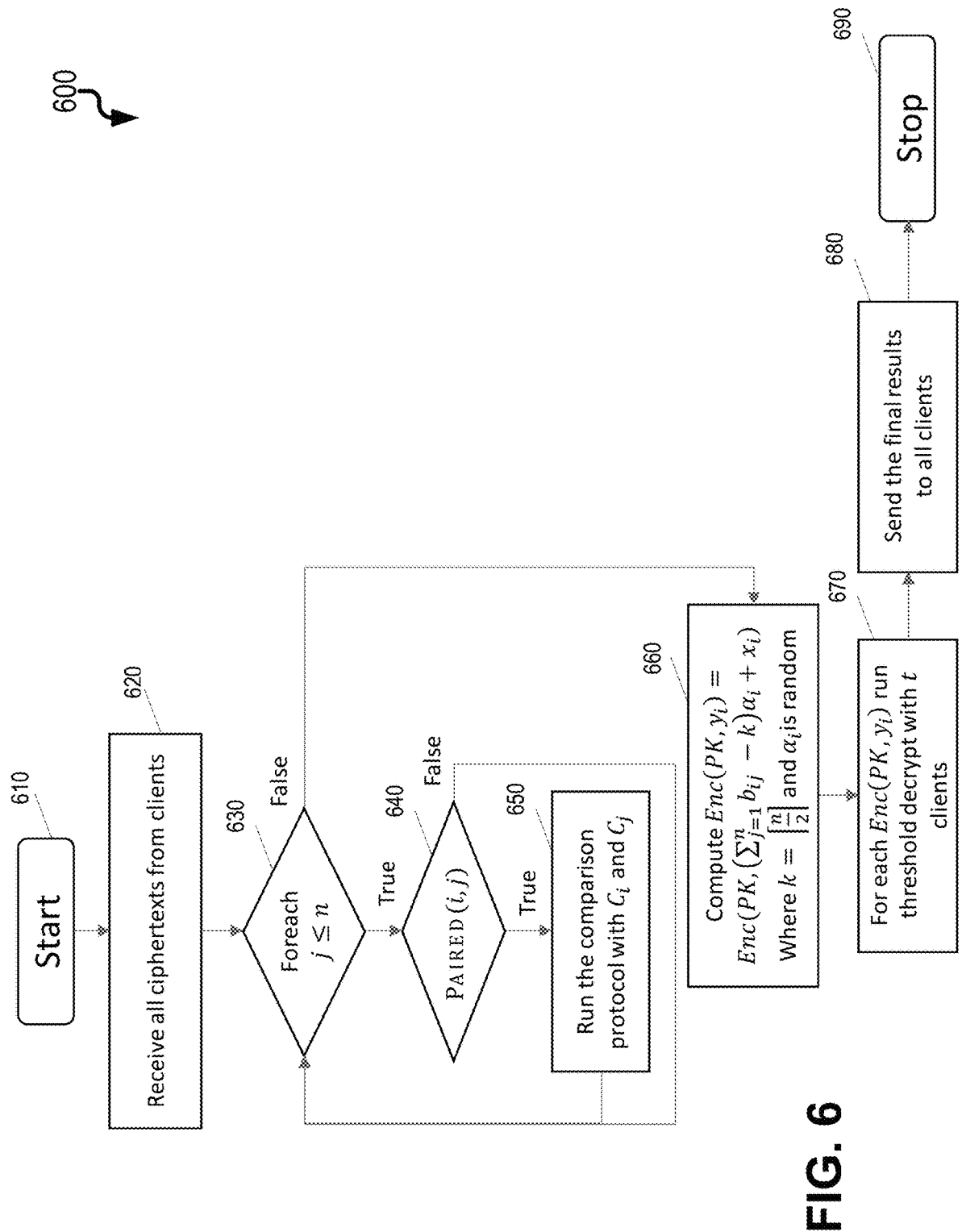
FIG. 6 is a process flow diagram illustrating the secure computation of a median of datasets from a server perspective.

FIG. 6 is a process flow diagram 600 that relates to the activities of the server 220 as part of Protocol 5 shown above. The process starts, at 610, with the server 220, at 620, receiving the ciphertexts from the clients $_{i \ldots j}$ 210. A loop commences, at 630, that iterates for each client. If, at 640, a pair of clients (i,j) satisfies the PAIRED predicate (Algorithm 1), then, at 650, the server 220 runs the DGK protocol with client $C_i$ as generator and client $C_j$ as the evaluator. After the computation, clients $C_i$ and $C_j$ get shares $\delta_{ij}$ and $\delta_{ji}$ of the result, which is encrypted under the common public key a $[\![ \delta_{ij} \oplus \delta_{ji} ]\!]$ and revealed to the server 220. Next, at 660, the server executes Algorithm 3 to compute the ranks and n ciphertexts among which exactly one is encrypting the median while the others are encrypting random plaintexts. The server 220 can then, at 670, run the threshold decryption using t clients and, at 680, the final result is provided by the server 220 to the clients 210 and the process can terminate at 690.

Figure 7:
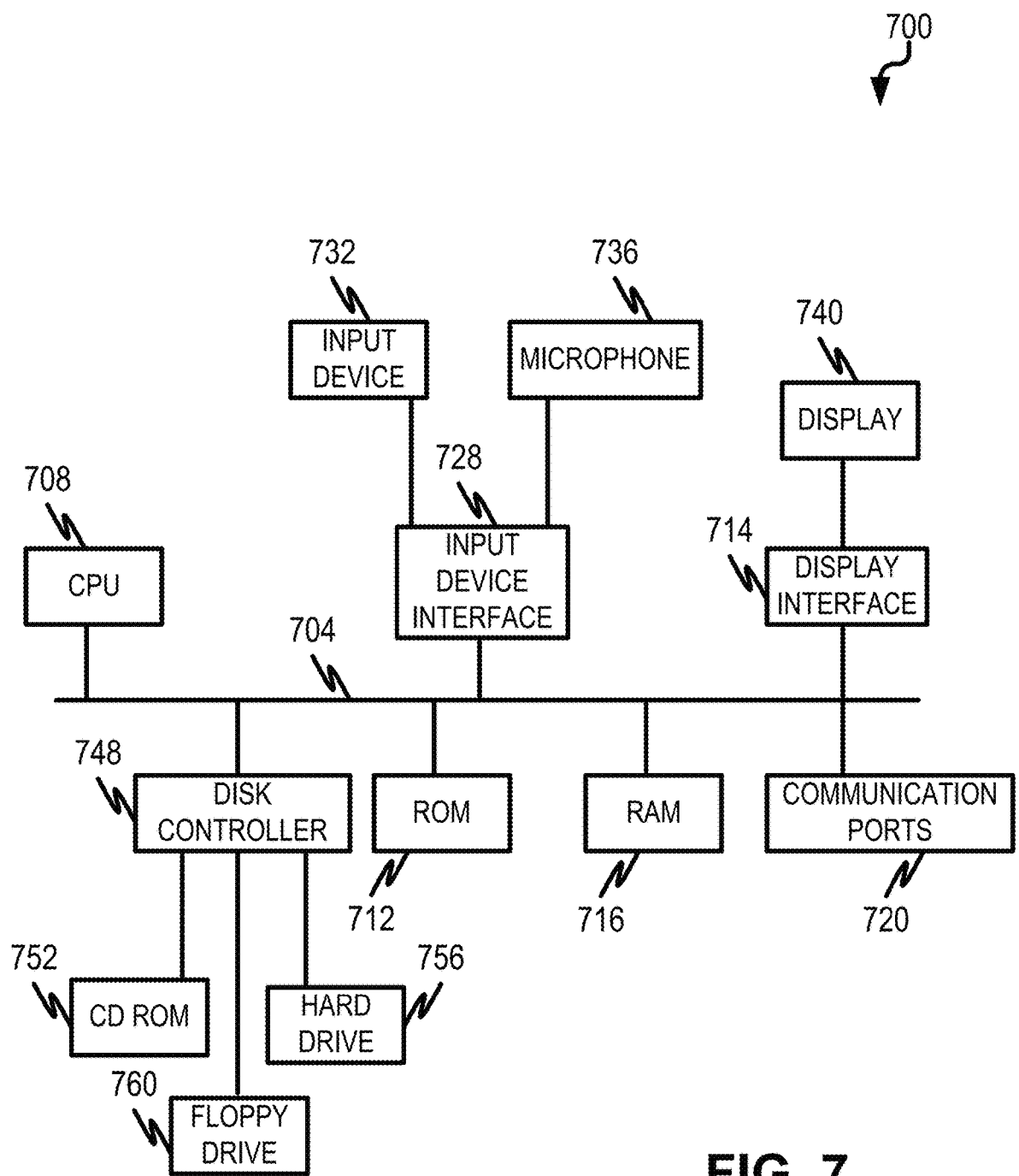
FIG. 7 is a diagram illustrating aspects of a computing device that can be used for implementing subject matter described herein.

FIG. 7 is a diagram 700 illustrating a sample computing device architecture for implementing various aspects described herein. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM) 716, can be in communication with the processing system 708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface with one or more optional disk drives to the system bus 704. These disk drives can be external or internal floppy disk drives such as 760, external or internal CD-ROM, CD-R, CD-RW or DVD, or solid state drives such as 752, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the at least one communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 via a display interface 714 to the user and an input device 732 such as keyboard and/or a pointing device (e.g., a mouse or a trackball) and/or a touchscreen by which the user can provide input to the computer. Other kinds of input devices 732 can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. The input device 732 and the microphone 736 can be coupled to and convey information via the bus 704 by way of an input device interface 728. Other computing devices, such as dedicated servers, can omit one or more of the display 740 and display interface 714, the input device 732, the microphone 736, and input device interface 728.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    pairing, by a server, each of a plurality of clients, the plurality of clients paired without a direct communications link between the clients in a pair;
    receiving, by the server from each of the plurality of clients, a corresponding data value encrypted using a common threshold public key;
    distributing, by the server, the received encrypted data values to the plurality of clients for evaluating comparison of values;
    comparing bitwise, by each pair of the plurality of clients, the corresponding data value for each client to generate encrypted comparison results;
    receiving, by the server, the encrypted comparison results from each pair of the plurality of clients in response to the distribution of the received encrypted data values, the encrypted comparison results being encrypted using the common threshold public key;
    computing, by the server, a first plurality of ciphertexts, each ciphertext of the first plurality of ciphertexts encrypting a rank of each client's data value by homomorphically adding the encrypted comparison results;
    sorting the first plurality of ciphertexts by the encrypted rank of each client's data value;
    computing, with each ciphertext of the first plurality of ciphertexts, a second plurality of ciphertexts,
    wherein a ciphertext of the second plurality of ciphertexts encrypting a median of the received data values comprises the received encrypted data value,
    wherein a ciphertext of the second plurality of ciphertexts not encrypting the median of the received data values comprises an encrypted random plaintext; and
    initiating, by the server using the plurality of clients, a threshold decryption to generate a final result.

2. The method of claim 1 further comprising:
    comparing, by each pair of clients, the received encrypted data values using a Damgard, Geisler and Kroigaard (DGK) comparison protocol.

3. The method of claim 1, wherein the threshold decryption comprises:
    transmitting, by the server, an encrypted evaluation result to each of t clients,
    wherein t represents a number of the plurality of clients;
    receiving, by the server, a partial decryption of the transmitted encrypted evaluation result from each of the t clients; and combining the partial decryption of the transmitted encrypted evaluation result from each of the t clients to result in the final result.

4. The method of claim 3 further comprising:
transmitting the final result to each of the plurality of clients.

5. The method of claim 1, wherein if a size of the received encrypted data values is odd, the median value is a middle value in the sorted received encrypted data values.

6. The method of claim 1, wherein if a size of the received encrypted data values is even, the median value is a mean of two middle values in the sorted received encrypted data values.

7. The method of claim 1 further comprising:
encrypting, by a first client, a data value of interest using a public key of the first client;
transmitting, by the first client, the encrypted data value of the first client to the server; and
forwarding, by the server, the encrypted data value of the first client to a second client.

8. The method of claim 7 further comprising:
choosing, by the second client, a random bit $\delta_{ji}$ and computing $s=1-2\delta_{ji}$, the random bit $\delta_{ji}$ being used to secret share a result of a comparison.

9. The method of claim 8 further comprising:
homomorphically evaluating, by the second client, a comparison circuit on its own data value of interest and the encrypted data value of the first client; and
generating, by the second client, corresponding ciphertexts.

10. The method of claim 9 further comprising:
sending, by the second client, the generated corresponding ciphertexts to the server;
forwarding, by the server, the generated corresponding ciphertexts to the first client;
computing, by the first client using the generated corresponding ciphertexts, a final encrypted comparison bit; and
sending, by the first client, the final encrypted comparison bit to the server.

11. A computer-implemented method comprising:
pairing, by a server, each of a plurality of clients, the plurality of clients paired without a direct communications link between the clients in a pair;
receiving, by the server from each pair of the plurality of clients, a corresponding data values encrypted using a common threshold public key;
comparing bitwise, by each pair of the plurality of clients, the corresponding data value for each client to generate encrypted comparison results;
computing, by the server, a first plurality of ciphertexts, each ciphertext of the first plurality of ciphertexts encrypting a rank of each client's data value by homomorphic addition;
sorting the first plurality of ciphertexts by the encrypted rank of each client's data value;
homomorphically computing, by the server and with each ciphertext of the first plurality of ciphertexts, a second plurality of ciphertexts,
wherein a ciphertext of the second plurality of ciphertexts encrypting a median of the received data values comprises the received encrypted data value,
wherein a ciphertext of the second plurality of ciphertexts not encrypting the median of the received data values comprises an encrypted random plaintext; and
distributing the ciphertext to each of the plurality of clients so that each pair of the plurality of clients can jointly decrypt the ciphertext to determine the median.

12. The method of claim 11, wherein if a size of the received encrypted data values is odd, the median value is a middle value in the sorted received encrypted data values.

13. The method of claim 11, wherein if a size of the received encrypted data values is even, the median value is a mean of two middle values in the sorted received encrypted data values.

14. A system comprising:
at least one data processor; and
memory storing instructions which, when executed by the at least one data processor, result in operations comprising:
pairing, by a server, each of a plurality of clients, the plurality of clients paired without a direct communications link between the clients in a pair;
receiving, by the server from each of a plurality of clients, a corresponding data value encrypted using a common threshold public key;
distributing, by the server, the received encrypted data values to each of the plurality of clients for evaluating comparison of values;
comparing bitwise, by each pair of the plurality of clients, the corresponding data value for each client to generate encrypted comparison results;
receiving, by the server, the encrypted comparison results from each of the plurality of clients in response to the distribution of the received encrypted data values, the encrypted comparison results being encrypted using the common threshold public key;
computing, by the server, a first plurality of ciphertexts, each ciphertext of the first plurality of ciphertexts encrypting a rank of each client's data value by homomorphically adding the encrypted comparison results;
sorting the first plurality of ciphertexts by the encrypted rank of each client's data values;
computing, with each ciphertext in the first plurality of ciphertexts, a second plurality of ciphertexts,
wherein a ciphertext of the second plurality of ciphertexts encrypting a median of the received data values comprises the received encrypted data value,
wherein a ciphertext of the second plurality of ciphertexts not encrypting the median of the received data values comprises an encrypted random plaintext; and
initiating, by the server using the plurality of clients, a threshold decryption to generate a final result.

15. The system of claim 14, wherein the operations further comprise:
comparing, by each pair of clients, the received encrypted data values using a Damgard, Geisler and Kroigaard (DGK) comparison protocol.

16. The system of claim 15, wherein the threshold decryption comprises:
transmitting, by the server, an encrypted evaluation result to each of t clients,
wherein t represents a number of the plurality of clients;
receiving, by the server, a partial decryption of the transmitted encrypted evaluation result from each of the t clients;
combining the partial decryption of the transmitted encryption evaluation result from each of the t clients to result in the final result; and
transmitting the final result to each of the t clients.

17. The system of claim 14, wherein the operations further comprise:
- encrypting, by a first client, a data value of interest using a public key of the first client;
- transmitting, by the first client, the encrypted data value of the first client to the server; and
- forwarding, by the server, the encrypted data value of the first client to a second client.

18. The system of claim 17, wherein the operations further comprise:
- choosing, by the second client, a random bit $\delta_{ji}$ and computing $s=1-2\delta_{ji}$, the random bit $\delta_{ji}$ being used to secret share a result of a comparison.

19. The system of claim 18, wherein the operations further comprise:
- homomorphically evaluating, by the second client, a comparison circuit on its own data value of interest and the encrypted data value of the first client; and
- generating, by the second client, corresponding ciphertexts.

20. The system of claim 19, wherein the operations further comprise:
- sending, by the second client, the generated corresponding ciphertexts to the server;
- forwarding, by the server, the generated corresponding ciphertexts to the first client;
- computing, by the first client using the generated corresponding ciphertexts, a final encrypted comparison bit; and
- sending, by the first client, the final encrypted comparison bit to the server.

* * * * *